(No Model.)

E. THOMSON.
MONOCYCLIC GENERATOR.

No. 555,590. Patented Mar. 3, 1896.

Witnesses:
A. F. Macdonald.
B. B. Hull.

Inventor:
Elihu Thomson, by
Geo. R. Blodgett,
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

MONOCYCLIC GENERATOR.

SPECIFICATION forming part of Letters Patent No. 555,590, dated March 3, 1896.

Application filed March 29, 1895. Serial No. 543,744. (No model.)

*To all whom it may concern:*

Be it known that I, ELIHU THOMSON, a citizen of the United States, residing at Swampscott, in the county of Essex, State of Massachusetts, have invented certain new and useful Improvements in Monocyclic Generators, of which the following is a specification.

My invention relates to monocyclic generators of the type described in the patent to Charles P. Steinmetz, No. 533,244, and in other patents to the same inventor, and has for its object to provide a means of altering existing alternating-current plants, so that they may be converted into monocyclic systems, as therein set out. To this end I provide, in addition to the armature of a generator of single-phase alternating electromotive force and mechanically coupled therewith, a smaller auxiliary armature, which I call herein a "teaser-armature," and from that armature I run the third main or main of displaced electromotive force, so that between it and the outer mains of the system differences of potential and phase exist, as in the systems of distribution above referred to.

In the practice of my invention it is, of course, immaterial what particular form the auxiliary or teaser machine may take; its armature may sometimes be run in its own separate field, separately regulated, or it may be run in the same field as the main armature, furnishing the displaced electromotive force either directly or through transformation. Other modifications will readily suggest themselves to an electrical engineer.

The accompanying drawings show typical embodiments of my invention, wherein—

Figure 1:
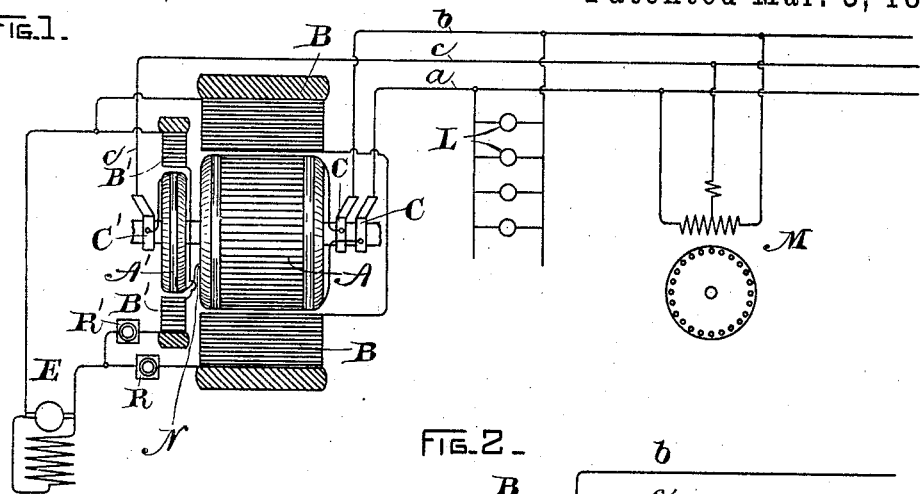
Figure 2:
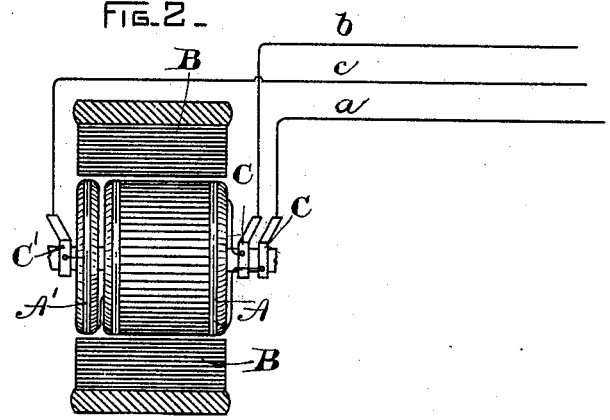

Figure 1 is a diagrammatic view, partly in section, of a generator and system of distribution arranged according to my invention. Fig. 2 is a similar view of a different form; and Fig. 3 is a modified form, feeding the third line through transformation.

In Fig. 1 A is the armature of a generator of the type described, B B are its field-magnets, C C its collecting-rings, with their appropriate brushes supplying the outside mains $a\ b$ of an ordinary alternating-current system. A' is the auxiliary or teaser armature having a winding upon a separate core from the main armature, which is connected at N to the central point of the main-armature coil. This teaser-armature in the case illustrated is provided with field-magnet poles corresponding in number to those of the main machine, it being desirable and necessary to preserve the same number of cycles in the third main of the system as in the others. C' is the collecting-ring for the teaser-armature, feeding the line $c$. E is an exciter common to both sets of field-magnets, the field-magnets B B being in series therewith, and the field-magnets B' B' being in shunt to the circuit through the field-magnets B B. Separate resistances R R' regulate the electromotive force of the two armatures. This separate regulability is a distinctive feature of my invention and has peculiar advantages, inasmuch as by it I am enabled to regulate the relative angular displacement of the phases of the system. In the system as thus outlined lamps L L are connected between the outer mains $a\ b$ of the single-phase system, operating in the ordinary way and by the ordinary means of regulation. At M, I illustrate a monocyclic motor, preferably of the type described in the patent to Charles P. Steinmetz, No. 533,249, which is provided with a main and auxiliary or teaser inducing-coil and a short-circuited armature.

Referring now to Fig. 2, I illustrate substantially the same arrangement as in Fig. 1, except that in this case I do not have the separately-regulable teaser-machine, inasmuch as the two armatures A and A' are connected at the middle point of the main armature A, are run in the same field, and are affixed to the same shaft.

Figure 3:
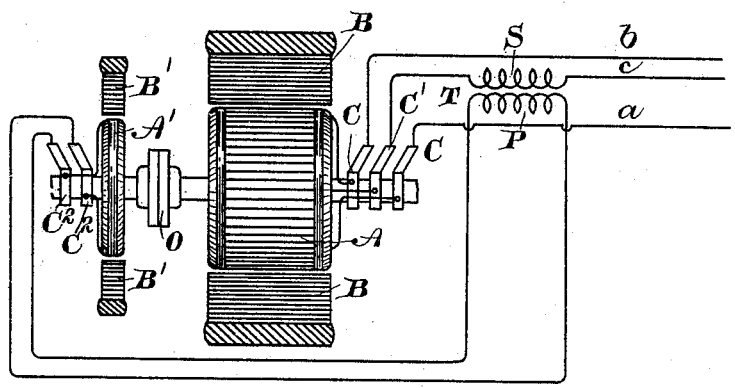

In Figs. 2 and 3 I do not illustrate the exciter, inasmuch as it is connected in the ordinary way in Fig. 2, and in Fig. 3 is connected as in Fig. 1.

Referring now to Fig. 3, I show how my improved connection may be applied to the feeding of the auxiliary main $c$ by transformation. In this case the parts of the single-phase system are as before, but the main $c$ is connected directly to the central point of the main-armature coil. Included in series in the main is the secondary S of the transformer, the primary P of which is fed from the collecting-rings $C^2\ C^2$ of the auxiliary armature A', which in this case is connected by the coupling O with the shaft of the main machine. Irrespective of the transformer T, the mains as connected in this figure would be like the Edison three-wire system with a single-phase alternater, the main c representing the neutral line of that system. The object of the transformer T, connected to the teaser-armature, is, however, to displace the phases, as in the other cases already described.

In all of the figures it is to be understood that the teaser-armature is rigidly connected to the main armature in such a way as to give an electromotive force of the same number of alternations, but displaced in phase. This may be accomplished in any convenient way, either by displacing the field-magnets, or, preferably, by fixing the armatures in such relation to each other as to give the desired displacement of phase. For instance, the armature A', occupying one position with reference to the field-poles, would be sixty degrees in advance or behind the phase of the main electromotive force.

What I claim as new, and desire to secure by Letters Patent of the United States, is—

1. In a monocyclic generator, a main armature generating single-phase alternating current, an auxiliary armature comprising a winding upon a separate core from the main armature, but mechanically connected with the main armature and generating an electromotive force of displaced phase, and a connection between the teaser-armature and the main armature.

2. In a monocyclic generator, a main armature and field-magnets generating single-phase alternating electromotive forces, a teaser-armature upon the same shaft having a separate core from the main armature and provided with field-magnets and adapted to generate an electromotive force of displaced phase, and separate means of regulation for the two armatures.

3. In a monocyclic generator, a main armature and field-magnets generating single-phase alternating current, a teaser-armature mechanically connected with the main armature and generating an electromotive force of displaced phase, a connection between the terminals of the main armature and two of the mains of the system, and an inductive connection between the teaser-armature and the third main.

4. The combination of a moving dynamo-electric source of alternating single-phase electromotive force, with an independent supplementary dynamo-electric source of electromotive force of displaced phase mechanically coupled with the first-named source and maintaining by the joint or resultant action of the two sources electromotive force of displaced phase in suitable electric circuits.

5. The combination of a moving dynamo-electric machine maintaining between a pair of mains single-phase alternating electromotive forces, with a third main connected to the center of said source of supply, and an independent supplementary dynamo-electric source of alternating electromotive force mechanically coupled with the first-named machine and maintaining an out-of-phase electromotive force on the third main.

In witness whereof I have hereunto set my hand this 26th day of March, 1895.

ELIHU THOMSON.

Witnesses:
JOHN W. GIBBONEY,
HENRY O. WESTENDARP.